Oct. 30, 1928.　　　　　　　　　　　　　　　　　1,689,816
C. P. CAULKINS
AGRICULTURAL MACHINE
Filed Aug. 2, 1926　　　3 Sheets-Sheet 1

Inventor
Cecil P. Caulkins
By Brown, Boettcher & Dienner
Att'ys

Oct. 30, 1928.
C. P. CAULKINS
1,689,816
AGRICULTURAL MACHINE
Filed Aug. 2, 1926
3 Sheets-Sheet 2
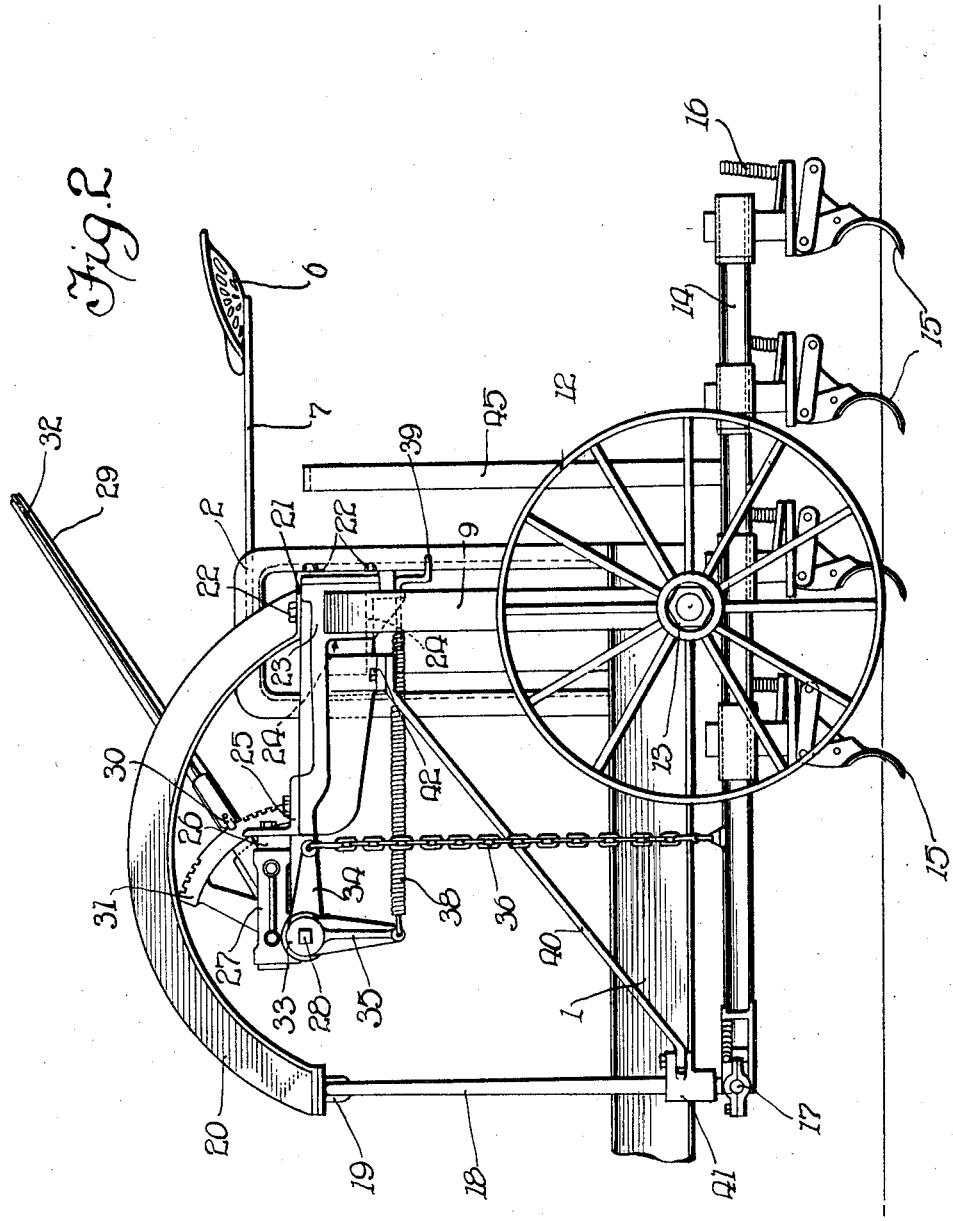
Inventor
Cecil P. Caulkins
By Brown, Boettcher & Dienner
Attys Oct. 30, 1928.
C. P. CAULKINS
1,689,816
AGRICULTURAL MACHINE
Filed Aug. 2, 1926
3 Sheets-Sheet 3
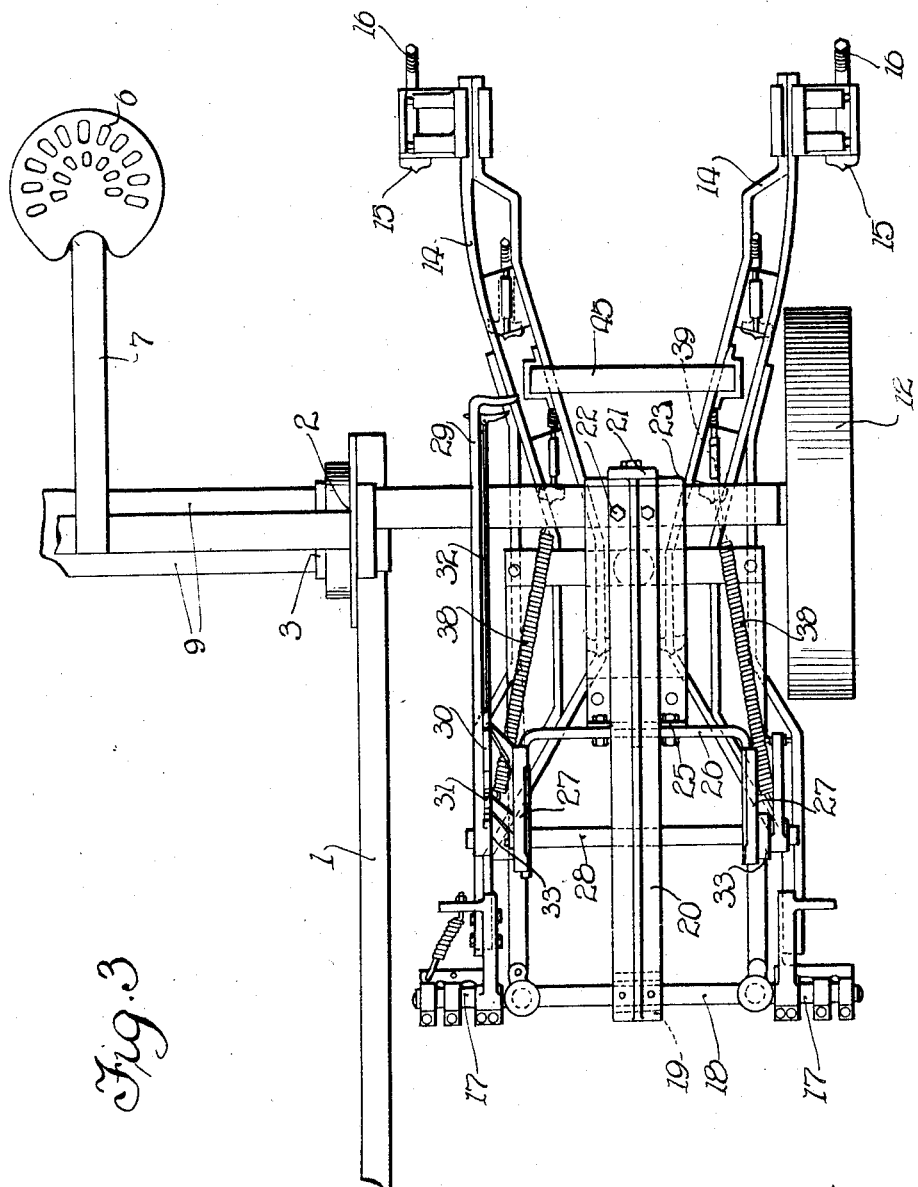
Inventor
Cecil P. Caulkins
By Brown, Boettcher & Diemer
Att'ys Patented Oct. 30, 1928.

1,689,816

UNITED STATES PATENT OFFICE.

CECIL P. CAULKINS, OF NEW LONDON, CONNECTICUT, ASSIGNOR TO GENERAL ORDNANCE CORPORATION, OF NEW YORK, N. Y., A CORPORATION OF NEW YORK.

AGRICULTURAL MACHINE.

Application filed August 2, 1926. Serial No. 126,510.

My invention relates to agricultural machines and is concerned especially with various improved provisions for adapting a cultivator, or other agricultural or soil treating implement to a traction vehicle, particularly to a traction vehicle having an axle and frame arrangement, such as that set out in Gregory C. Davison Patent No. 1,511,873, October 14, 1924.

My invention seeks the simplification and reduction to a minimum of the parts of the agricultural implement, the reduction to a minimum of the parts for attaching or adapting the same to the traction vehicle, an improved controlling arrangement for operating the implement from the tractor or drawing vehicle, and various other features of improvement and combination increasing the adaptability of the implement to the traction vehicle and the efficiency, simplicity, and compactness of the resulting combination.

An embodiment of the invention is illustrated in the accompanying drawings, in which:

Figure 2 is a side elevational view of the rear portion of the tractor and attached agricultural implement; and Figure 3 is a plan view of the same.

Figure 1:
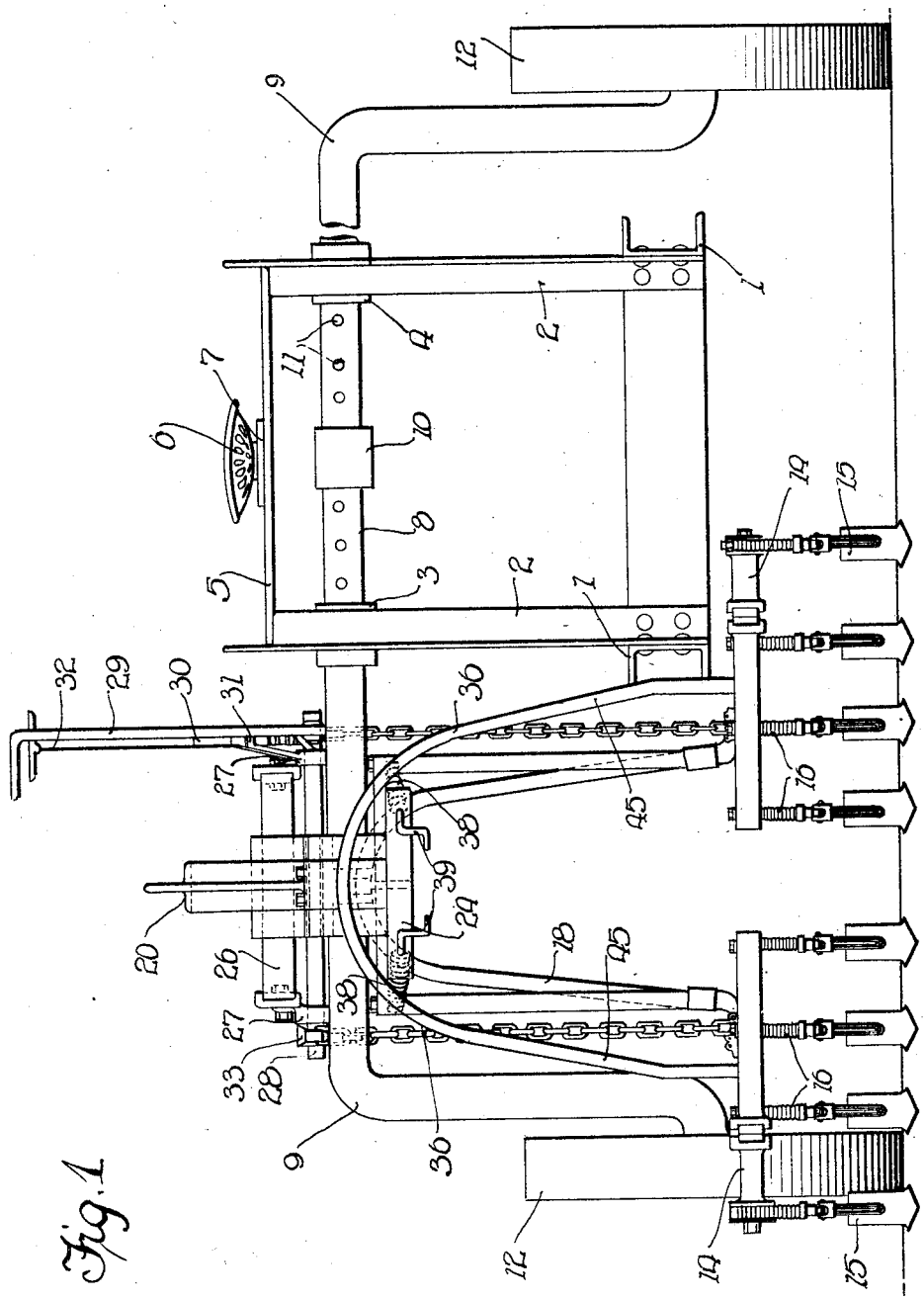
Figure 1 illustrates in rear elevation a traction vehicle with an agricultural implement attached thereto in accordance with the teachings of my invention.

Before proceeding with the detailed description, I wish to point out that while I shall describe my invention in connection with the details of a particular embodiment, I do not intend thereby to limit the invention to such details as the provisions for attaching the implement to the tractor, as well as the provisions for supporting and controlling the implement, etc. will vary with variations in the design of the implement used.

Referring now to the drawings, the rear end of the low relatively narrow tractor frame 1 is provided at its opposite sides with upright frame members 2—2 between the vertical legs of which axle carrying blocks 3 and 4 are slidably mounted substantially as set out in the hereinbefore refered application filed by Gregory C. Davison. The upper ends of the upright frame members 2—2 are tied together by a cross plate 5 extending transversely therebetween, and secured at its opposite ends thereto. The driver's seat 6 is mounted upon a spring 7 secured to the cross plate 5 and extending rearwardly therefrom. The rear axle 8 of the vehicle comprises a pair of arched axle sections 9—9 adjustable transversely through the supporting bearings 3 and 4 and an intermediate bearing 10 which intermediate bearing may be provided with a pin receiving aperture for the reception of a suitable locking pin which may be inserted through registering apertures 11 in the horizontal portions of the axle sections 9—9 to lock the tread of the rear wheels 12—12 in adjusted position. The outer end of each of the axle sections 9—9 is turned down to provide a suitable spindle for the reception of a wheel 12 which wheel is held against axial displacement from such spindle by a suitable cooperating nut and washer 13.

It is to the arched axle sections 9—9 that I have provided for attaching or adapting an agricultural implement of which the particular cultivator shown is typical. This cultivator comprises the usual implement carrying beams 14—14, the parallel intermediate and rear diverging portions of each of which beams carries a series or gang of adjustable soil treating blades, teeth, or shovels 15. These blades 15 may be pivoted and retained in proper ground engaging position by means of suitable coil springs 16 as shown, or they may be mounted in any other usual or preferred manner.

The beams 14—14 are pivotally mounted at their forward ends upon the out-turned lower ends 17 of a carrying arch 18. This pivotal mounting of the implement carrying beams 14—14 permits of a vertical oscillating movement or play of the beams so that the implement may be raised or lowered as will be hereinafter more fully set out. The pivotal mounting in itself is preferably such that convenient removal of the beams may be had thereby making the beams interchangeable and conveniently replaceable. The upper portion of the carrying arch 18 from which the downwardly extending legs depend is pivotally mounted in a strap or bracket 19 bolted or otherwise suitably secured to and depending from the forward end of an arched beam member 20. The opposite end of the arched frame member 20 carries a mounting angle 21 through which mounting angle and suitable bolts 22 the arched frame member is securely mounted upon the adjacent end of a supporting arm 23. This end of the supporting arm 23 is channeled as shown at 24 to receive the upper horizontally extending portion of the arched axle section 9 of the vehicle upon which the arm 23 is securely mounted by means of the mounting angle 21 of the frame member 20 and the cooperating bolts 22.

The supporting arm 23 extends forwardly from the arched portion of the axle section 9 and carries at its opposite or forward end an angle bracket 25 to which is secured a transversely extending bar 26, the opposite forwardly extending ends of which carry bearing plates 27 in which the opposite ends of a cross shaft 28 are journaled. This cross shaft 28 is adapted to be rotated by means of a lever 29 mounted upon the inner end thereof and extending into position for convenient access from the seat 6 of the tractor. The lever 29 is secured in adjusted position by means of a suitable latch 30 adapted for cooperation with suitable notches in the periphery of a sector 31. A rod 32 provides for releasing the latch when it is desired to rotate the shaft 28. Bell crank levers 33 having rearwardly extending horizontal arms 34 and downwardly extending arms 35 are mounted upon each of the opposite ends of the cross shaft 28 for rotation therewith.

Chains 36 connected at their opposite ends with the rearwardly extending horizontal arms 34 of the bell crank lever 33 and with the pivoted implement carrying beams 14 respectively provide for lifting these beams 14 about the out-turned lower ends 17 of the arch 18 upon counterclockwise rotation of the shaft 28. Clockwise rotation of the shaft 28 permits the beams 14 to descend and consequently the blades 15 to return to their proper soil engaging position. The weight of each of the implement carrying beams 14 and the implement carried thereby is counterbalanced by means of suitable coil springs 38 attached at their forward ends to the downwardly extending arms 35 of the bell crank levers 33 and at their opposite or rear ends to crank arms 39 adjustably secured in the channeled end 24 of the supporting arm 23. The tension of these coiled counterbalancing springs 38 can thereby be quickly and easily adjusted from the driver's seat 6 of the tractor to vary the soil engaging positions of the blades 15, as well as to compensate for different weights of gangs, etc.

A pair of diagonal braces 40 connected at their lower ends through sleeves 41 with the downwardly depending legs of the carrying arch 18 extend to and are secured at their opposite ends as through suitable bolts 42 to the supporting arm 23. Frequently, in sowing or planting some of the seeds are thrown slightly to one side or the other thereby causing the plant when it grows to be out of line and the row of plants thereby irregular. For this reason, it is frequently necessary for the operator to swing the gangs of cultivator blades to one side or the other, in order to properly cultivate around such plants as are out of line without tearing them up. For this purpose, a loop or arched guide 45, the lower ends of the vertical legs of which are attached to the implement carrying beams 14—14, is provided. This guide extends up and is arched adjacent the seat 6 of the tractor, so that the operator can (from the tractor) swing the group of cultivator blades 15 to the right or to the left as desired to cultivate about such plants as are irregular or out of line.

In operation, the operator sits on the seat 6 of the tractor or drawing vehicle from which the steering wheel, engine clutch and throttle (not shown) of the tractor are all in this particular arrangement within convenient reach of his right hand. His left hand is, therefore, free to operate the control lever 29 through which both gangs of cultivator blades may be raised together or dropped into the ground to the depth which he desires to cultivate. While not shown, suitable levers may be provided for lifting the respective gangs 14—14 either independently or simultaneously as desired. Upon thus setting the cultivator blades, his left hand is free to grasp the looped or arched guide 45 so that he can while watching the crops come through the arch 18 of the cultivator and the arched axle section 9 make minor corrections for cultivating to the right or to the left as desired while any larger variations required, due to considerable irregularities in the rows, can be corrected by steering the tractor accordingly through the steering wheel (not shown) accessible from the seat 6. The tractor is preferably although, of course, not necessarily of short wheel base, the cultivator gangs being suspended beneath the rear axle thereby requiring attention only to the row being cultivated as the same passes through the arch 18 and under the axle 9 so that the operator can guide the tractor accordingly without watching the front wheels thereof.

It will now be apparent that I have increased the adaptability of implements of this type to the traction vehicle and the efficiency, simplicity, and compactness of the resulting combination. Certain of the attaching elements serve to support the implement and the various attaching and implement parts are thereby reduced to a minimum.

It will also be apparent that a cultivator can by this arrangement be attached to each of the axle sections 9—9 at opposite sides of the tractor frame 1 to cultivate two rows of crops at the same time if so desired. This, of course, is governed by the particular condition of operation, as well as by the choice of the operator and is really immaterial in so far as my invention is concerned. The attachment would be generally the same in connection with each implement. As hereinbefore pointed out, I do not intend to confine the invention to the particular supporting and attaching arrangement shown as the particular structural details will vary with the different types of implements that may be used.

I claim:—

1. In combination, a relatively low narrow tractor frame, a narrow upright axle frame thereon, a single arched axle having a horizontally extending portion mounted in said axle frame and depending wheel carrying portions spaced from opposite sides of said tractor and axle frames and forming crop straddling arches at opposite sides thereof, a supporting arm carried by the horizontally extending portion of the axle between the depending end thereof and the axle frame, an arched support carried by and depending from the free end of said arm, implement carrying beams pivoted on the lower ends of said arched support, and means carried by the horizontally extending portion of the arched axle for raising and lowering said implement carrying beams.

2. In combination, a relatively low narrow tractor frame, a narrow upright axle frame thereon, a single arched axle having a horizontally extending portion mounted in said axle frame and depending wheel carrying portions spaced from opposite sides of said tractor and axle frames and forming crop straddling arches at opposite sides thereof, a supporting arm carried by the horizontally extending portion of the axle between the depending end thereof and the axle frame, an arched support carried by and depending from the free end of said arm, implement carrying beams pivoted on the lower ends of said arched support, means carried by the horizontally extending portion of the arched axle for raising and lowering said implement carrying beams and a guide member attached to said implement carrying beams and arched upwardly for guiding said beams without interfering with the crops.

3. In combination, a relatively low narrow tractor frame, a narrow upright axle frame thereon, a single arched axle having a horizontally extending portion mounted in said axle frame and depending wheel carrying portions spaced from opposite sides of said tractor and axle frames and forming crop straddling arches at opposite sides thereof, a supporting arm carried by the horizontally extending portion of the axle between the depending end thereof and the axle frame, a second supporting arm carried by the horizontally extending portion of the axle and arched over and extending beyond said first arm, a supporting arch carried by and depending from said last arm, implement carrying beams pivoted on the lower ends of said supporting arch and means carried by said first arm for raising and lowering said implement carrying beams.

4. In combination, a relatively low narrow tractor frame, a narrow upright axle frame thereon, a single arched axle having a horizontally extending portion mounted in said axle frame and depending wheel carrying portions spaced from opposite sides of said tractor and axle frames and forming crop straddling arches at opposite sides thereof, a supporting arm carried by the horizontally extending portion of the axle between the depending end thereof and the axle frame, a second supporting arm carried by the horizontally extending portion of the axle and arched over and extending beyond said first arm, a supporting arch carried by and depending from said last arm, implement carrying beams pivoted on the lower ends of said supporting arch, a seat mounted upon the axle frame, means carried by said first arm for raising and lowering said implement carrying beams and an arched guide member attached to the implement carrying beams rearwardly of the axle frame and upstanding for access from said seat for guiding said beams therefrom.

5. In combination, a relatively low narrow tractor frame, a narrow upright axle frame thereon, a single arched axle having a horizontally extending portion mounted in said axle frame and depending wheel carrying portions spaced from opposite sides of said tractor and axle frames and forming crop straddling arches at opposite sides thereof, a supporting arm carried by the horizontally extending portion of the axle between the depending end thereof and the axle frame, a second supporting arm carried by the horizontally extending portion of the axle and arched over and extending beyond said first arm, a supporting arch carried by and depending from said last arm, implement carrying beams pivoted on the lower ends of said supporting arch, a shaft rotatably journaled in said first arm, a bell crank mounted upon said shaft, a lifting chain connected between said bell crank and the implement carrying beams, a spring connected with said bell crank and tending to lift said implement carrying beams and means carried by said first arm for raising and lowering said beams.

In witness whereof, I hereunto subscribe my name this 27th day of July, 1926.

CECIL P. CAULKINS.